United States Patent
Heiner et al.

(10) Patent No.: US 7,280,482 B2
(45) Date of Patent: Oct. 9, 2007

(54) DYNAMIC LOAD DISTRIBUTION USING LOCAL STATE INFORMATION

(75) Inventors: Andreas Heiner, Espoo (FI); Sergey Balandin, Helsinki (FI)

(73) Assignee: Nokia Corporation, Espoo (FI)

(*) Notice: Subject to any disclaimer, the term of this patent is extended or adjusted under 35 U.S.C. 154(b) by 1009 days.

(21) Appl. No.: 10/286,477

(22) Filed: Nov. 1, 2002

(65) Prior Publication Data
US 2004/0203827 A1    Oct. 14, 2004

(51) Int. Cl.
H04L 12/28    (2006.01)
G06F 15/173   (2006.01)

(52) U.S. Cl. .................. 370/238; 370/401; 709/242

(58) Field of Classification Search ............. 370/229, 370/237, 238, 351, 400, 401; 709/239–242
See application file for complete search history.

(56) References Cited

U.S. PATENT DOCUMENTS

| | | | | |
|---|---|---|---|---|
| 5,029,075 A * | 7/1991 | Hirasawa | .................... | 709/241 |
| 5,426,640 A * | 6/1995 | Hluchyj et al. | ............. | 370/235 |
| 5,600,638 A * | 2/1997 | Bertin et al. | ................. | 370/351 |
| 5,995,503 A * | 11/1999 | Crawley et al. | ............. | 370/351 |
| 6,098,107 A | 8/2000 | Narvaez-Guarnieri et al. | | |
| 6,201,810 B1 * | 3/2001 | Masuda et al. | ........ | 370/395.32 |
| 6,647,412 B1 * | 11/2003 | Strandberg et al. | ......... | 709/223 |
| 6,667,956 B2 * | 12/2003 | Beshai et al. | ................ | 370/238 |
| 6,765,872 B1 * | 7/2004 | Tazaki | ........................ | 370/235 |
| 6,785,260 B1 * | 8/2004 | Goyal et al. | ................. | 370/351 |
| 6,914,877 B1 * | 7/2005 | Alamineh | .................... | 370/217 |
| 2002/0067693 A1 | 6/2002 | Kodialam et al. | | |
| 2002/0103631 A1 | 8/2002 | Feldmann et al. | | |
| 2002/0147842 A1 | 10/2002 | Breitbart et al. | | |
| 2002/0167901 A1 * | 11/2002 | Brown et al. | ................ | 370/229 |
| 2003/0206527 A1 * | 11/2003 | Yim | ........................... | 370/238 |

FOREIGN PATENT DOCUMENTS

EP    1 087 576    3/2001

OTHER PUBLICATIONS

International Search Report mailed Jan. 30, 2004.

* cited by examiner

*Primary Examiner*—Chau Nguyen
*Assistant Examiner*—Hong Sol Cho
(74) *Attorney, Agent, or Firm*—Squire, Sanders & Dempsey L.L.P.

(57) ABSTRACT

The present invention concerns a dynamic load distributing method and system using local state information in a communication network comprising nodes connected by links. State information is transmitted from one or more nodes to one or more neighboring nodes. A traffic flow comprising packets is originated at a source node to be transmitted to a destination node via available paths. Weights are determined for the available paths as a decreasing function of cost of the corresponding path, state information of the present node and received state information of one or more nodes at the corresponding path. One of the paths is selected based on the determined weights. The traffic flow is dispatched to the next node of the selected path. Said determining weights, selecting paths and dispatching the traffic flow is repeated at one or more nodes via which the traffic flow is forwarded.

23 Claims, 2 Drawing Sheets

DYNAMIC LOAD DISTRIBUTION USING LOCAL STATE INFORMATION

FIELD OF THE INVENTION

The present invention relates to communications. In particular, the present invention relates to a novel and improved dynamic load distributing method and system using local state information in a communication network.

BACKGROUND OF THE INVENTION

A communication network comprises nodes connected by links. A node refers to a network element implementing a protocol used for communicating with other nodes. A link refers to a communication facility or medium over which nodes can communicate. A communication network may either be connectionless such as an IP-based (Internet Protocol) network, or connection-oriented such as a fixed telephone network. When a traffic flow comprising data packets is transmitted from a given source node to a given destination node, there are often multiple different routes available via various nodes and links between the source and destination node. These routes are referred to as paths. In the following the term path is used to refer specifically to a loop-free path.

Different paths have different costs associated with them. For example, a given path may have higher delay than another path. Thus it is advantageous to determine these costs beforehand and select a path based on this information. Since a traffic flow comprising packets may be distributed via multiple paths simultaneously, more than one paths may also be selected.

The process of determining costs and selecting paths is often referred to as load distribution. Load in this context refers to the amount of packets or bytes being transferred over nodes and links thus loading them. Distributing traffic flows over multiple paths in a communication network has several advantages, such as fast failure recovery due to pre-existence of multiple available paths between source and destination, higher throughput for a given infrastructure and reduced packet delay. Load distribution may be static, in which case assignment of jobs to hosts is done probabilistically or deterministically, without consideration of runtime events. Alternatively load distribution may be dynamic, in which case it is designed to overcome problems of unknown or uncharacteriseable workloads, non-pervasive scheduling and runtime variation, i.e. any situation where availability of hosts, composition of workload or interaction of human beings can alter resource requirements or availability. Dynamic load distribution systems typically monitor workload and hosts for any factors that may affect the choice of the most appropriate assignment and distribute jobs accordingly.

A prior art method of static load distributing based on cost optimization is based on an estimate of static traffic demand between all node pairs and a weight function that is a decreasing function of the load over a link. Optimizing is performed using this heuristic cost function so that the cost of the total network is minimal, i.e. throughput through the network is optimized. The usefulness of the method is completely dependent on the accuracy of the traffic demand estimates.

A prior art method of dynamic load distributing based on cost adjustment is generally referred to as Optimized Multi Path. Costs associated with links are slowly changed based on changes of network state parameters. If OSPF-protocol (Open Shortest Path First) is used in connection with Optimized Multi Path, information about the changes is disseminated in opaque LSAs (Link State Advertisement). Adjustments in link costs are made gradually enough to insure stability, yet to provide reasonably fast reaction to traffic demands. Paths between two nodes are based on the adjusted costs, so the paths may change over time.

There are problems with prior art load distributing. Mechanisms that efficiently distribute traffic generally require network-wide state information to optimize or adjust path selection. These mechanisms use state information collected over varying time scales. Therefore they are reactive and operate on an hours to days time scale. Load distribution mechanisms that do not affect the paths between source and destination, on the other hand, distribute the load in a node over the available paths optionally including the costs of available paths. These mechanisms do not consider state information other than that which they may have themselves. Another problem associated with dynamic load distribution is maintaining flow integrity at all times. If flow integrity is not maintained, packet re-ordering generally occurs. In the case of TCP-based (Transmission Control Protocol) traffic this will reduce throughput considerably, whereas in the case of UDP-based (User Datagram Protocol) traffic applications may not be able to recover from packet reversal.

Thus there is obvious need for a solution providing efficient dynamic load distribution using local state information in a communication network as well as using information of the neighbors to improve efficiency by taking into account the local environment.

SUMMARY OF THE INVENTION

The present invention concerns a dynamic load distributing method and system using local state information in a communication network comprising nodes connected by links. One or more nodes transmit their state information to one or more neighboring nodes. A neighboring node to a present node refers to a node which is directly, i.e. via one link, connected to the present node. If a neighboring node cannot process the received state information, it generates a corresponding signaling packet and transmits it to its respective neighboring nodes and so on until the point where the state information can be processed. This allows limiting signaling to a very small area.

A traffic flow comprising packets is originated at a source node to be transmitted to a destination node via available paths. Weights are determined for the available paths. Each weight is determined as a decreasing function of cost of the corresponding path, state information of the present node i.e. the node determining the weight, and received state information of one or more nodes at the corresponding path. One of the paths is selected based on the determined weights. The traffic flow is dispatched to the next node of the selected path. Said determining weights, selecting paths and dispatching the traffic flow are repeated at one or more nodes via which the traffic flow is forwarded.

In an embodiment of the invention said transmitting of state information is performed by using OSPF-protocol (Open Shortest Path First), e.g. opaque LSA (Link State Advertisement) type 9.

In an embodiment of the invention at one or more nodes the traffic flow is dispatched to the next nodes in fractions proportional to the weights determined for the paths which said nodes are a part of.

In an embodiment of the invention packet classification, based on e.g. a prior art algorithm called the longest prefix match (LPM), is performed on arriving packets at one or more nodes, one or more fields of the arriving packets is hashed to obtain a hash value, and the obtained hash value is associated with a next node of the path with the highest determined weight.

In an embodiment of the invention the cost of a path comprises delay associated with said path.

In an embodiment of the invention the state information of a node comprises load on links from said node to next nodes.

In an embodiment of the invention the state information of a node comprises CPU load of said node.

In an embodiment of the invention the state information of a node comprises buffer load of said node.

In an embodiment of the invention the communication network is a connectionless network.

In an embodiment of the invention the communication network is a connection-oriented network.

In an embodiment of the invention the communication network is an IP network.

In an embodiment of the invention the communication network is an IP-RAN network (Internet Protocol Radio Access Network).

The invention improves load distribution for short temporal traffic fluctuations. Load distribution according to the present invention minimizes the probability of congestion in downstream nodes due to sending traffic too aggressively to its optimal path. Alternative paths may be used as hot-standby paths for fast traffic protection. For example, in case of failure of the most favored link to next node traffic may be diverted quickly, a new set of multiple paths may be calculated and traffic will be distributed gracefully over the new set of feasible paths. Additionally, the invention is simple to implement as it only requires additional hash tables, means to determine state information of a present node and received state information of one or more nodes at the corresponding path, as well as means to relay said state information of one or more nodes at the corresponding path. Further, the present invention can be used in a multivendor environment.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
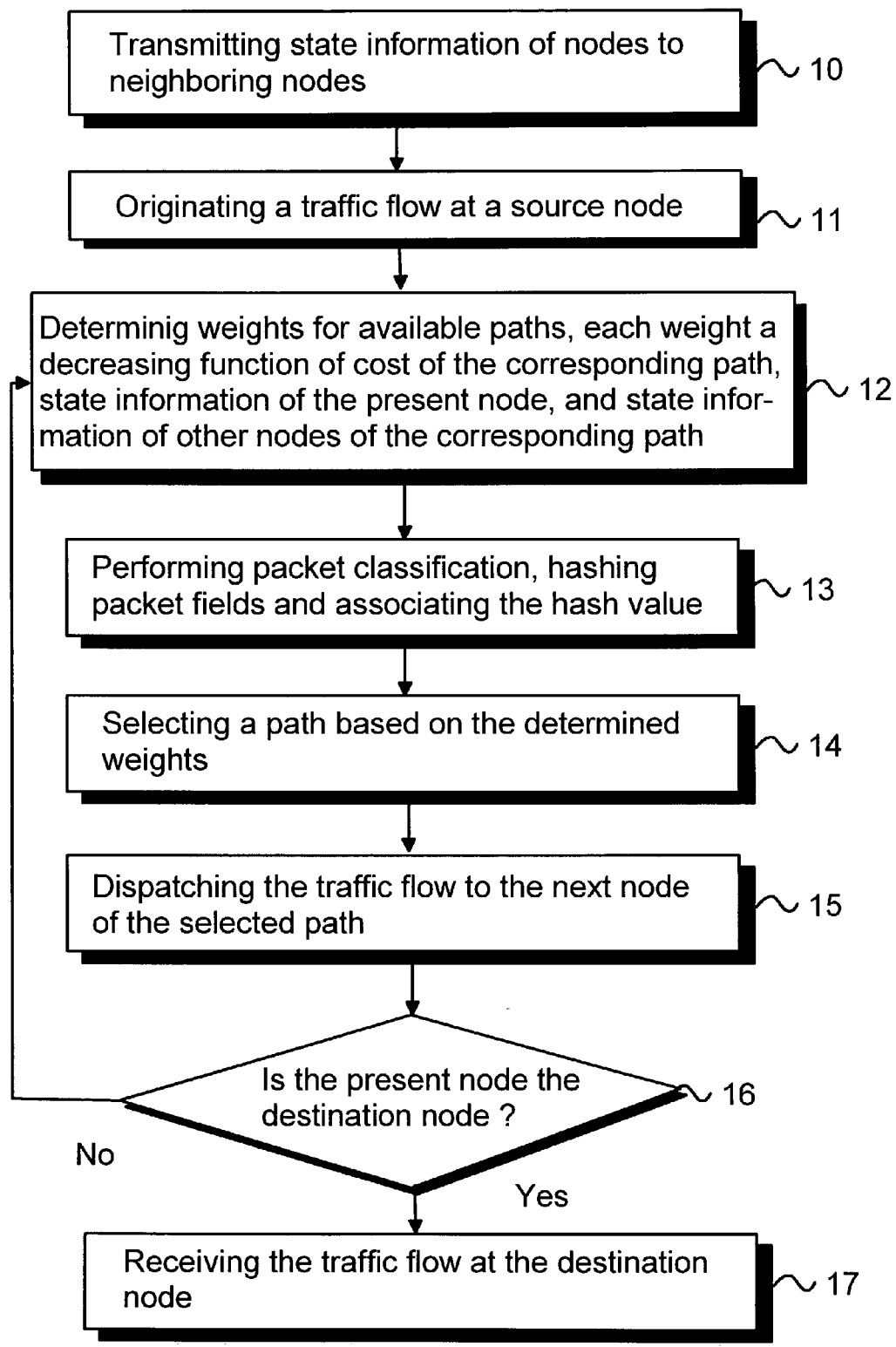
FIG. 1 is a diagram illustrating a dynamic load distributing method using local state information according to one embodiment of the present invention.

FIG. 1 illustrates a dynamic load distributing method using local state information in a communication network comprising nodes connected by links according to one embodiment of the present invention.

One or more nodes transmit their state information to one or more neighboring nodes, phase 10. In the embodiment of the invention disclosed in FIG. 1 this is performed by using OSPF (Open Shortest Path First) opaque LSA (Link State Advertisement) type 9. The state information may be transmitted either periodically, or in special cases such as when a given node begins to become congested. A traffic flow comprising packets is originated at a source node to be transmitted to a destination node via available paths, phase 11. In phase 12 weights are determined for the available paths. Each weight is a decreasing function of cost of the corresponding path, state information of the present node i.e. the node determining the weight, and received state information of one or more nodes at the corresponding path. In the embodiment of the invention disclosed in FIG. 1 the cost of a path comprises delay associated with said path, the state information of a node comprises load on links from said node to next nodes, CPU load of said node, and buffer load of said node.

Packet classification, based e.g. on the longest prefix match (LPM), is performed on the packets, one or more fields of the packets is hashed to obtain a hash value, and the obtained hash value is associated with a next node of the path with the highest determined weight, phase 13. One path is selected based on the determined weights, phase 14. The traffic flow is dispatched to the next node of the selected path, phase 15. Said determining weights, selecting paths and dispatching the traffic flow are repeated at one or more nodes via which the traffic flow is forwarded until the traffic flow reaches the destination node, phases 16 and 17. At one or more nodes the traffic flow may be dispatched to the next nodes in fractions proportional to the weights determined for the paths which said nodes are a part of (not illustrated in FIG. 1).

Figure 2:
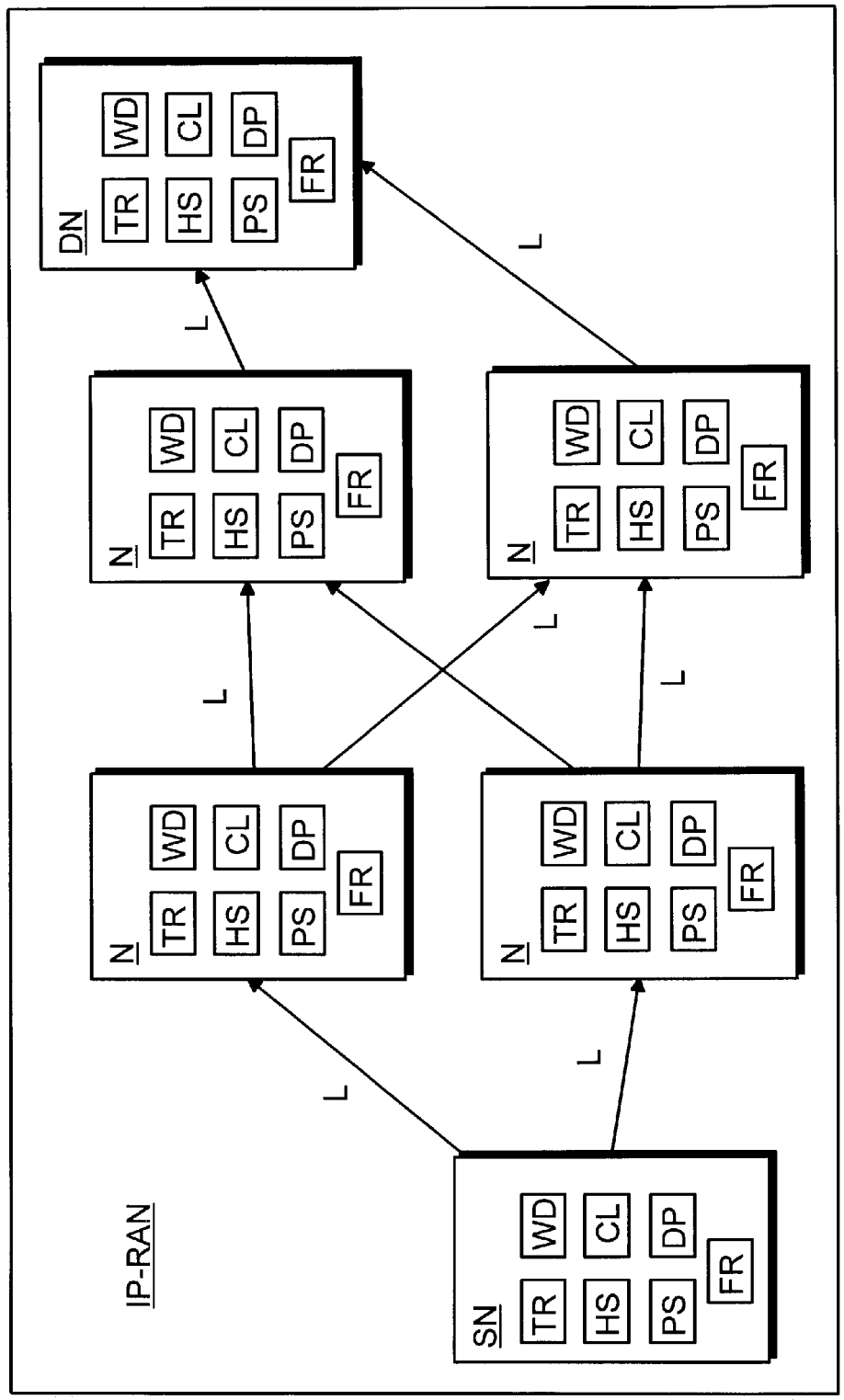
FIG. 2 is a block diagram illustrating a dynamic load distributing system using local state information according to one embodiment of the present invention.

FIG. 2 illustrates a dynamic load distributing system using local state information in a communication network according to one embodiment of the present invention. In the embodiment of the invention disclosed in FIG. 2 the communication network is an IP-RAN network (Internet Protocol Radio Access Network), i.e. a connectionless network. The network comprises multiple nodes N connected by links L. The node originating a traffic flow comprising packets to be transmitted is referred to as a source node SN. The node being destination for the traffic flow transmitted via available paths is referred to as destination node DN.

In the embodiment of the invention disclosed in FIG. 2 one or more nodes comprise a weight determiner WD for determining weights for the available paths. Each weight is determined as a decreasing function of cost of the corresponding path, state information of the present node, and received state information of one or more nodes at the corresponding path. In the embodiment of the invention disclosed in FIG. 2 the cost of a path comprises delay associated with said path, whereas the state information of a node comprises load on links from said node to next nodes, CPU load of said node and/or buffer load of said node. One or more nodes further comprise a path selector PS for selecting a path based on the determined weights. One or more nodes further comprise a dispatcher DP for dispatching the traffic flow to the next node of the selected path. One or more nodes further comprise a fractionalizer FR for dispatching the traffic flow to the next nodes in fractions proportional to their respective weights.

In the embodiment of the invention disclosed in FIG. 2 one or more nodes further comprise a transmitter TR for transmitting state information of the node to one or more neighboring nodes. The transmitter may use e.g. OSPF opaque LSA type 9 for transmitting state information. The transmitter may transmit state information either periodically, or in special cases such as when the corresponding node begins to become congested. One or more nodes further comprise a classifier CL for performing packet classification on arriving packets, and a hasher HS hashing one or more fields of the classified packets to obtain a hash value, and for associating the obtained hash value with a next node of the path with the highest determined weight.

In the embodiment of the invention disclosed in FIG. 2 the weight determiner, path selector, dispatcher, fractionalizer, transmitter, classifier and hasher may be implemented in software and/or hardware.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method for dynamic load distributing, wherein the method comprises:
   transmitting from one or more nodes state information of a node to one or more neighboring nodes,
   originating a traffic flow comprising packets at a source node to be transmitted to a destination node via available paths,
   determining weights for the available paths, each weight determined as a decreasing function of cost of the corresponding path, state information of the present node, and received state information of one or more nodes at the corresponding path,
   selecting a next node of a path based on the determined weights,
   dispatching the traffic flow to the next node of the selected path,
   repeating said determining weights, selecting a next node and dispatching the traffic flow at each subsequent node via which the traffic flow is forwarded,
   performing packet classification on arriving packets at one or more nodes,
   hashing one or more fields of the classified packets to obtain a hash value, and
   associating the obtained hash value with a next node of the path with the highest determined weight.

2. The method according to claim 1, wherein said transmitting of state information is performed by using OSPF-protocol.

3. The method according to claim 1, wherein at one or more nodes the traffic flow is dispatched to the next nodes in fractions proportional to their respective weights.

4. The method according to claim 1, wherein the cost of a path comprises delay associated with said path.

5. The method according to claim 1, wherein the state information of a node comprises load on links from said node to next nodes.

6. The method according to claim 1, wherein the state information of a node comprises CPU load of said node.

7. The method according to claim 1, wherein the state information of a node comprises buffer load of said node.

8. The method according to claim 1, wherein the communication network is a connectionless network.

9. The method according to claim 1, wherein the communication network is a connection-oriented network.

10. The method according to claim 1, wherein the communication network is an IP network.

11. The method according to claim 1, wherein the communication network is an IP-RAN network.

12. A dynamic load distributing system, comprising:
   a source node of a plurality of nodes, said source node for originating a traffic flow comprising packets to be transmitted via available paths; and
   a destination node of the plurality of nodes for receiving the transmitted packets;
   wherein at least one of said source node and said destination node comprises,
   a transmitter configured to transmit state information of said at least one node to one or more neighboring nodes,
   a weight determiner configured to determine weights for the available paths, each weight determined as a decreasing function of cost of the corresponding path, state information of the present node, and received state information of one or more nodes at the corresponding path,
   a path selector configured to select a node of a path based on the determined weights,
   a dispatcher configured to dispatch the traffic flow to a next node of the selected path,
   wherein the weight determiner determines weights at each subsequent node of the selected path,
   wherein said at least one node further comprises
   a classifier configured to perform packet classification on arriving packets, and
   a hasher configured to hash one or more fields of the classified packets to obtain a hash value, and to associate the obtained hash value with a next node of the path with the highest determined weight.

13. The system according to claim 12, wherein said transmitter uses OSPF-protocol for transmitting state information.

14. The system according to claim 12, wherein one or more nodes further comprise:
   a fractionalizer configured to dispatch the traffic flow to the next nodes in fractions proportional to their respective weights.

15. The system according to claim 12, wherein the cost of a path comprises delay associated with said path.

16. The system according to claim 12, wherein the state information of a node comprises load on links from said node to next nodes.

17. The system according to claim 12, wherein the state information of a node comprises CPU load of said node.

18. The system according to claim 12, wherein the state information of a node comprises buffer load of said node.

19. The system according to claim 12, wherein the communication network is a connectionless network.

20. The system according to claim 12, wherein the communication network is a connection-oriented network.

21. The system according to claim 12, wherein the communication network is an IP network.

22. The system according to claim 12, wherein the communication network is an IP-RAN network.

23. A dynamic load distributing system, comprising:
   a source node of a plurality of nodes, said source node for originating a traffic flow comprising packets to be transmitted via available paths; and
   a destination node of the plurality of nodes, for receiving the transmitted packets;
   wherein at least one of said source node and said destination node comprises;
   a transmitter means for transmitting state information of said at least one node to one or more neighboring nodes, a weight determiner means for determining weights for the available paths, each weight determined as a decreasing function of cost of the corresponding path, state information of the present node, and received state information of one or more nodes at the corresponding path, a path selector means for selecting a next node of a path based on the determined weights, and a dispatcher means for dispatching the traffic flow at each subsequent node of the selected path, wherein the weight determiner means determines weights at each of the subsequent nodes of the selected path, wherein said at least one node further comprises a classifying means for performing packet classification on arriving packets, and a hashing means for hashing one or more fields of the classified packets to obtain a hash value, and to associate the obtained hash value with a next node of the path with the highest determined weight.

* * * * *